United States Patent
Bullman et al.

(10) Patent No.: US 7,483,419 B2
(45) Date of Patent: *Jan. 27, 2009

(54) DSL AUTOMATIC PROTOCOL DETECTION SYSTEM

(75) Inventors: William R. Bullman, Bethlehem, PA (US); Scott L. McCurdy, Whitehall, PA (US)

(73) Assignee: Agere Systems Inc., Allentown, PA (US)

( * ) Notice: Subject to any disclaimer, the term of this patent is extended or adjusted under 35 U.S.C. 154(b) by 744 days.

This patent is subject to a terminal disclaimer.

(21) Appl. No.: 10/877,851

(22) Filed: Jun. 25, 2004

(65) Prior Publication Data

US 2004/0252703 A1 Dec. 16, 2004

Related U.S. Application Data

(63) Continuation of application No. 09/599,682, filed on Jun. 22, 2000, now Pat. No. 6,778,505.

(60) Provisional application No. 60/174,205, filed on Jan. 3, 2000.

(51) Int. Cl.
   *H04L 12/66* (2006.01)
   *H04L 12/28* (2006.01)
   *H04M 1/24* (2006.01)

(52) U.S. Cl. ............. 370/356; 370/395.5; 379/26.01; 379/27.01

(58) Field of Classification Search ........... 370/395.5, 370/255; 379/26.01, 27.01
   See application file for complete search history.

(56) References Cited

U.S. PATENT DOCUMENTS

| | | | |
|---|---|---|---|
| 5,894,557 A | 4/1999 | Bade et al. | 709/228 |
| 6,084,881 A | 7/2000 | Fosmark et al. | 370/397 |
| 6,108,350 A | 8/2000 | Araujo et al. | 370/467 |
| 6,122,287 A * | 9/2000 | Ohanian et al. | 370/465 |
| 6,529,479 B1 * | 3/2003 | Suzuki | 370/236.1 |
| 6,535,589 B1 | 3/2003 | Nauman et al. | 379/93.33 |
| 6,553,020 B1 * | 4/2003 | Hughes et al. | 370/347 |

(Continued)

FOREIGN PATENT DOCUMENTS

EP    001035722 A1    2/2000

(Continued)

*Primary Examiner*—Hassan Kizou
*Assistant Examiner*—Brandon Renner
(74) *Attorney, Agent, or Firm*—Mendelsohn & Associates, P.C.; Steve Mendelsohn

(57) ABSTRACT

A CPE application automatically detects an intermediate-layer protocol used at a DSL-connection head end and configures the DSL modem driver for that protocol. The application sets the driver to a possible driver protocol and attempts to connect to a head-end server. If a response is received from the head end, then the application reads the headers on the responsive message to determine whether the protocol at the head end is consistent with the protocol that the DSL modem is set to. If so, then the settings are loaded into the driver. If no response is received from the head end, then the application initiates a series of commands to elicit a response from the head end. If the protocol is not consistent or no response is elicited, then the DSL modem is set to another protocol, and the application again attempts to connect to the server at the head end.

11 Claims, 5 Drawing Sheets

U.S. PATENT DOCUMENTS

| | | | |
|---|---|---|---|
| 6,560,215 B1 * | 5/2003 | Bloem et al. | 370/347 |
| 6,580,760 B1 | 6/2003 | Larsen | 375/257 |
| 6,587,476 B1 * | 7/2003 | Lewin et al. | 370/467 |
| 6,594,251 B1 * | 7/2003 | Raissinia et al. | 370/347 |
| 6,631,120 B1 * | 10/2003 | Milbrandt | 370/252 |
| 6,636,505 B1 * | 10/2003 | Wang et al. | 370/352 |
| 6,778,505 B1 * | 8/2004 | Bullman et al. | 370/254 |
| 6,985,722 B1 * | 1/2006 | Snelgrove et al. | 455/420 |
| 2001/0030977 A1 | 10/2001 | May | 370/475 |

FOREIGN PATENT DOCUMENTS

| | | |
|---|---|---|
| EP | 001124402 A2 | 2/2001 |
| WO | WO 99/65219 | 12/1999 |

* cited by examiner

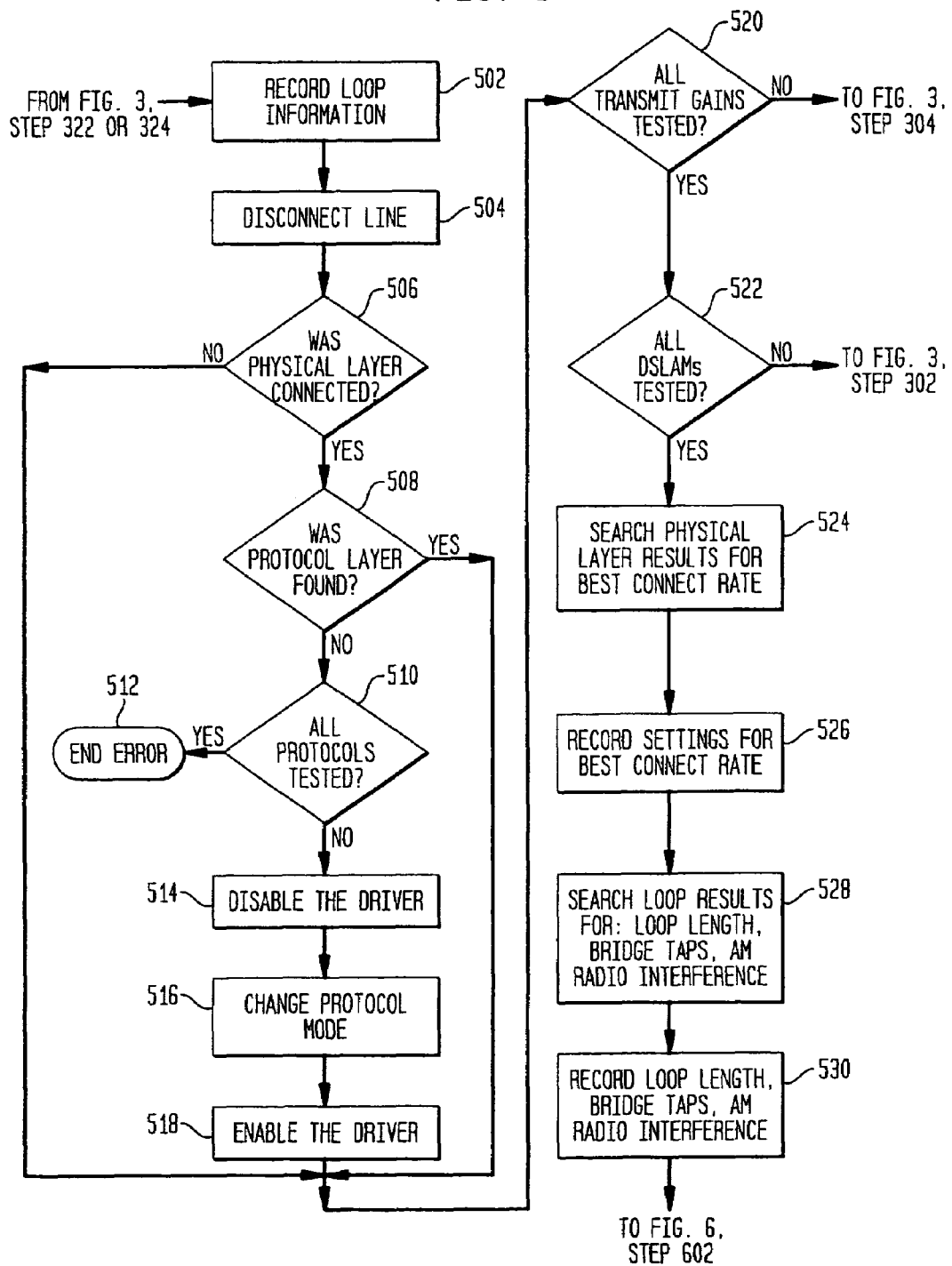

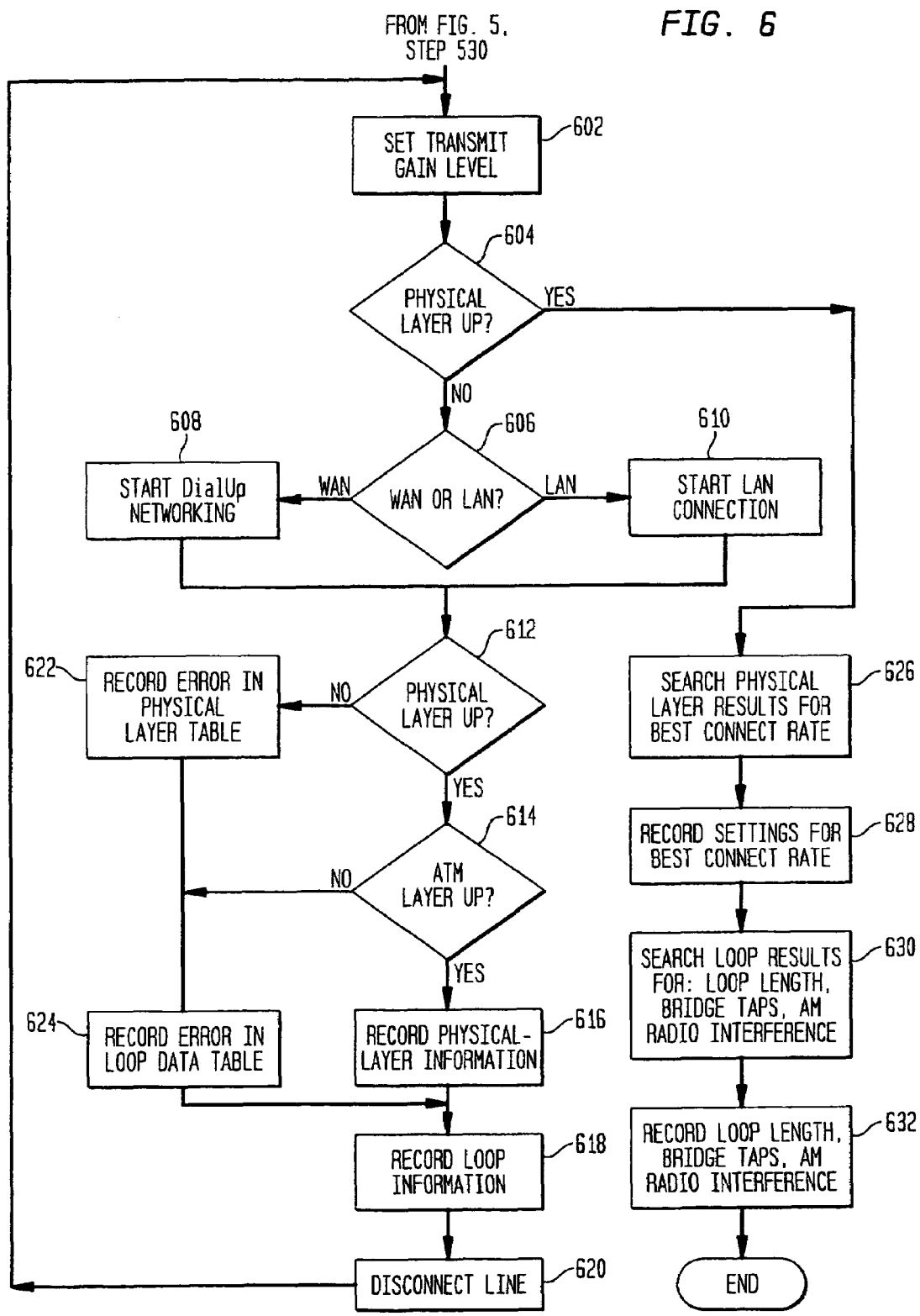

DSL AUTOMATIC PROTOCOL DETECTION SYSTEM

RELATED CASES

This is a continuation of application Ser. No. 09/599,682, filed on Jun. 22, 2000 now U.S. Pat. No. 6,778,505, which claimed benefit of the filing date of U.S. provisional application No. 60/174,205, filed on Jan. 3, 2000.

BACKGROUND OF THE INVENTION

1. Field of the Invention

The present invention relates to digital communications, and, in particular, to a method for configuring a digital subscriber line (DSL) modem to a DSL connection.

2. Description of the Related Art

Digital subscriber line (DSL) modems are widely used in digital communications systems for Internet access. Historically, DSL modems, which are installed in the customer premises equipment (CPE), have been provided by the same entity that controls the central office (i.e., head-end) equipment, allowing the modem driver to be programmed for the network-layer protocol (i.e., transmission mode) that is used at the head end. However, as DSL modems are marketed by entities that do not control the head-end equipment, the DSL modem driver must be configured during installation for the network-layer protocol used at the head end.

Currently, there are three protocols that are used for wide area network (WAN) connections (e.g., dial-up connections), and four protocols that are used for local area network (LAN) connections. According to the prior art, when installing a new DSL modem, a user must know a priori which particular protocol is used at the head end, in order to correctly configure his/her DSL modem so that it will connect to the head end. One method for determining the protocol used at the head end is to contact the entity that controls the head-end equipment. However, this solution is undesirable, because it can cause delays in DSL modem installation, and it can result in expenses incurred for service calls. Another problem is that some clients may not be capable of or even want to perform the task of configuring a DSL modem driver for the head-end protocol. Yet another problem is that when a DSL modem cannot be configured properly, a user may not be able to determine whether the problem is the wrong protocol or inadequate physical-layer settings.

SUMMARY OF THE INVENTION

The present invention is directed to a technique for automatically detecting the network-layer protocol used by the protocol layer at the head end of a DSL connection and automatically setting the driver configuration for that protocol. According to the present invention, the DSL modem driver is set to one of the possible protocols for the type of driver being used (e.g., WAN or LAN) and attempts to connect to a server at the head end. If a response is received from the head end, then the application reads the headers on the responsive message to determine whether the protocol at the head end is consistent with the current protocol. If the protocols are consistent, then the settings are loaded onto the driver. If no response is received from the head end when the application attempts to connect to the server, then the application initiates a series of commands for the purpose of eliciting a response from the head end. If the protocols are not consistent or no response is elicited, then the DSL modem is set to another protocol, and another attempt is made to connect to the server at the head end. These steps are repeated until either the correct head-end protocol is found or the possible protocols are exhausted.

The present invention can detect the network-layer protocol used at the head end of a DSL and set a modem driver configuration for that protocol. Using the present invention, a DSL modem can be installed without knowing a priori the protocol used at the head end. Nor does the user need to make a service call to determine the head-end protocol. Under the present invention, multiple protocols can be tested without the need to re-start or re-boot the system (except when switching between LAN and WAN modes, in which case the system would need to be re-started).

In one embodiment, the present invention is a method, implemented by customer premises equipment (CPE), for automatically and remotely determining a digital subscriber line (DSL) intermediate-layer protocol of a head end of a DSL link between the CPE and the head end. The CPE and the head end each have a protocol stack comprising an intermediate layer located below a transport layer and above a DSL layer. The method comprises the steps of (a) attempting to initiate a DSL connection over the DSL link to the head end using a selected intermediate-layer protocol; (b) determining whether the selected intermediate-layer protocol is the intermediate-layer protocol of the head end based on results of step (a); and (c) when the selected intermediate-layer protocol is not the DSL protocol of the head end, then selecting another intermediate-layer protocol and repeating steps (a) and (b).

BRIEF DESCRIPTION OF THE DRAWINGS

Other aspects, features, and advantages of the present invention will become more fully apparent from the following detailed description, the appended claims, and the accompanying drawings in which:

FIGS. 3-6 show flow diagrams for an application for automatically determining the head-end protocol for a DSL modem, according to one embodiment of the present invention.

DETAILED DESCRIPTION

Figure 1:
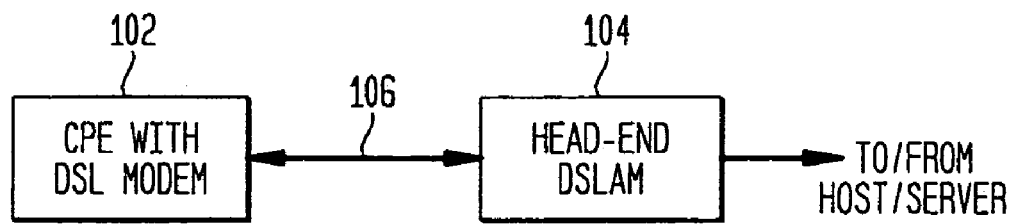
FIG. 1 shows a representation of equipment used in a digital subscriber line (DSL) connection.

As shown in FIG. 1, a digital subscriber line (DSL) connection typically comprises a computing unit (e.g., a personal computer) with a DSL modem, collectively known as client premises equipment (CPE) 102. CPE 102 is connected to a head-end digital subscriber line access multiplexer (DSLAM) 104 through a physical connection 106, such as a telephone line. Client or user applications implemented within CPE 102 communicate with the DSL modem through a software program called a driver, which is also implemented within CPE 102. The driver should be configured for the network-layer protocol used by DSLAM 104.

Figure 2:
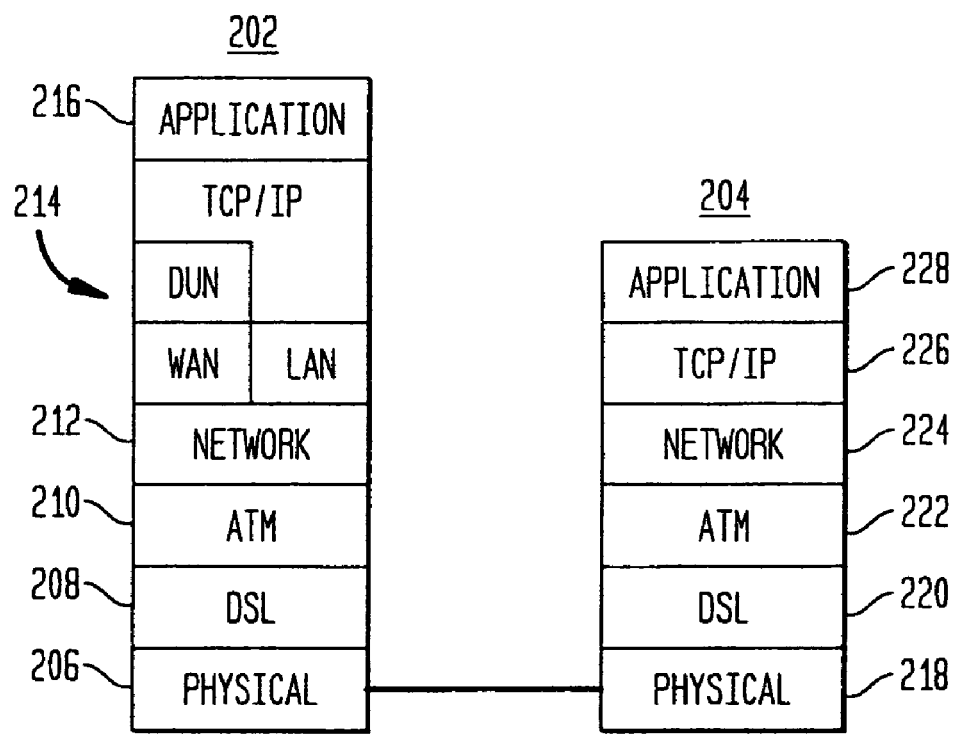
FIG. 2 shows a representation of the communication layers of the DSL connection of FIG. 1.

Typically, Internet communications comprise multiple embedded layers. Each embedded layer of the communication has one or more protocols that generally have headers to provide the information necessary for transmitting the communication. FIG. 2 shows the DSL connection layers for the DSL connection shown in FIG. 1, where: CPE protocol stack 202 in FIG. 2 is the protocol stack at CPE 102 of FIG. 1 and head-end protocol stack 204 is the protocol stack at head-end DSLAM 104. CPE protocol stack 202 comprises a physical layer 206, a digital subscriber line (DSL) layer 208, an asynchronous transfer mode (ATM) layer 210, a network layer 212, a transport layer 214, and an application layer 216. Transport layer 214 can be a LAN-type layer using a transmission control protocol/Internet protocol (TCP/IP) or a WAN-type layer using a dial-up network (DUN) protocol in addition to TCP/IP. Head-end protocol stack 204 comprises a physical layer 218, a DSL layer 220, an ATM layer 222, a network layer 224, a transport layer 226, and an application layer 228. For meaningful communication to take place, network layer 212 of CPE protocol stack 202 must be compatible with network layer 224 of head-end protocol stack 204. That is, CPE 102 in FIG. 1 must be configured to use the same network-layer protocol that is used at DSLAM 104.

Figure 3:
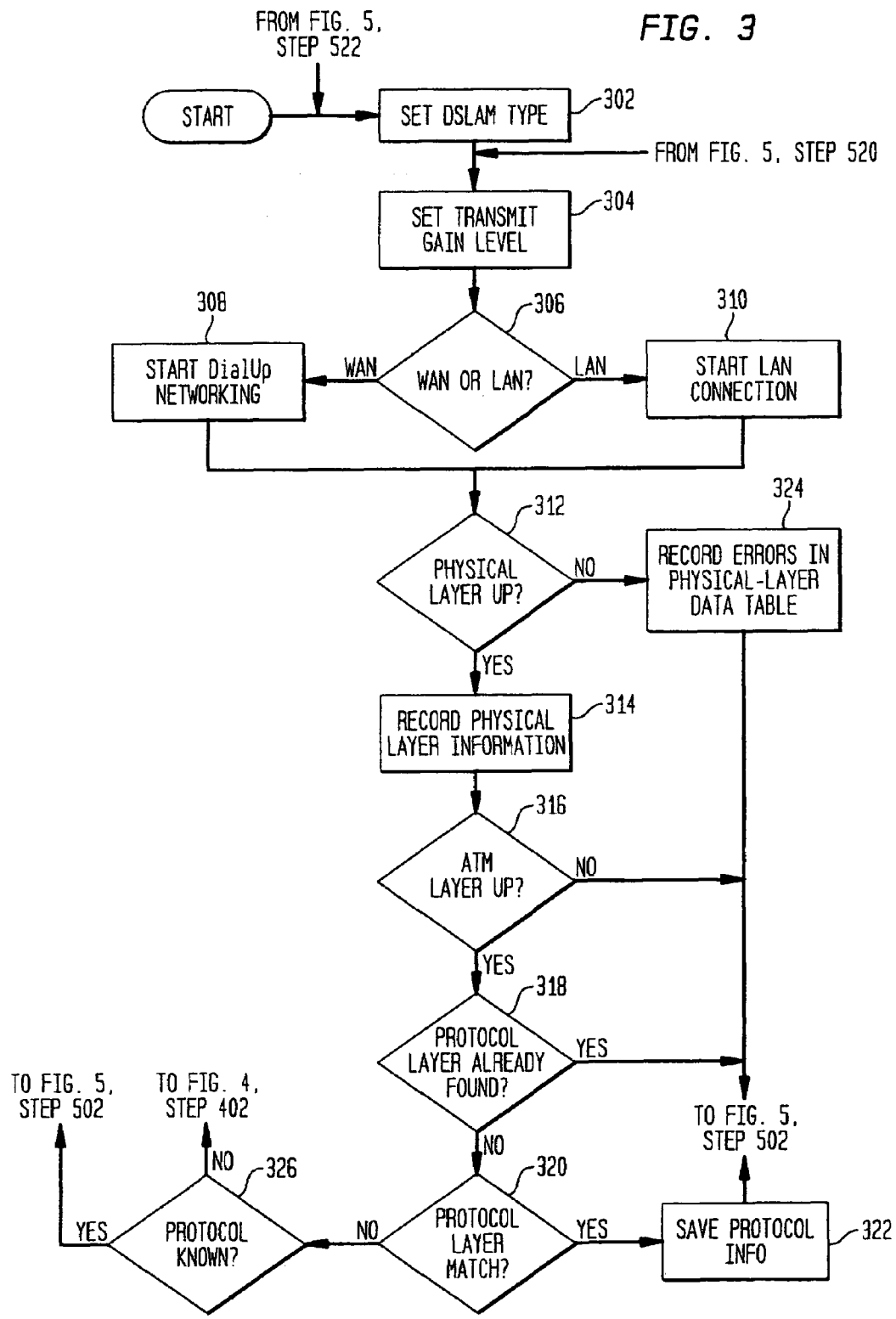
Figure 4:
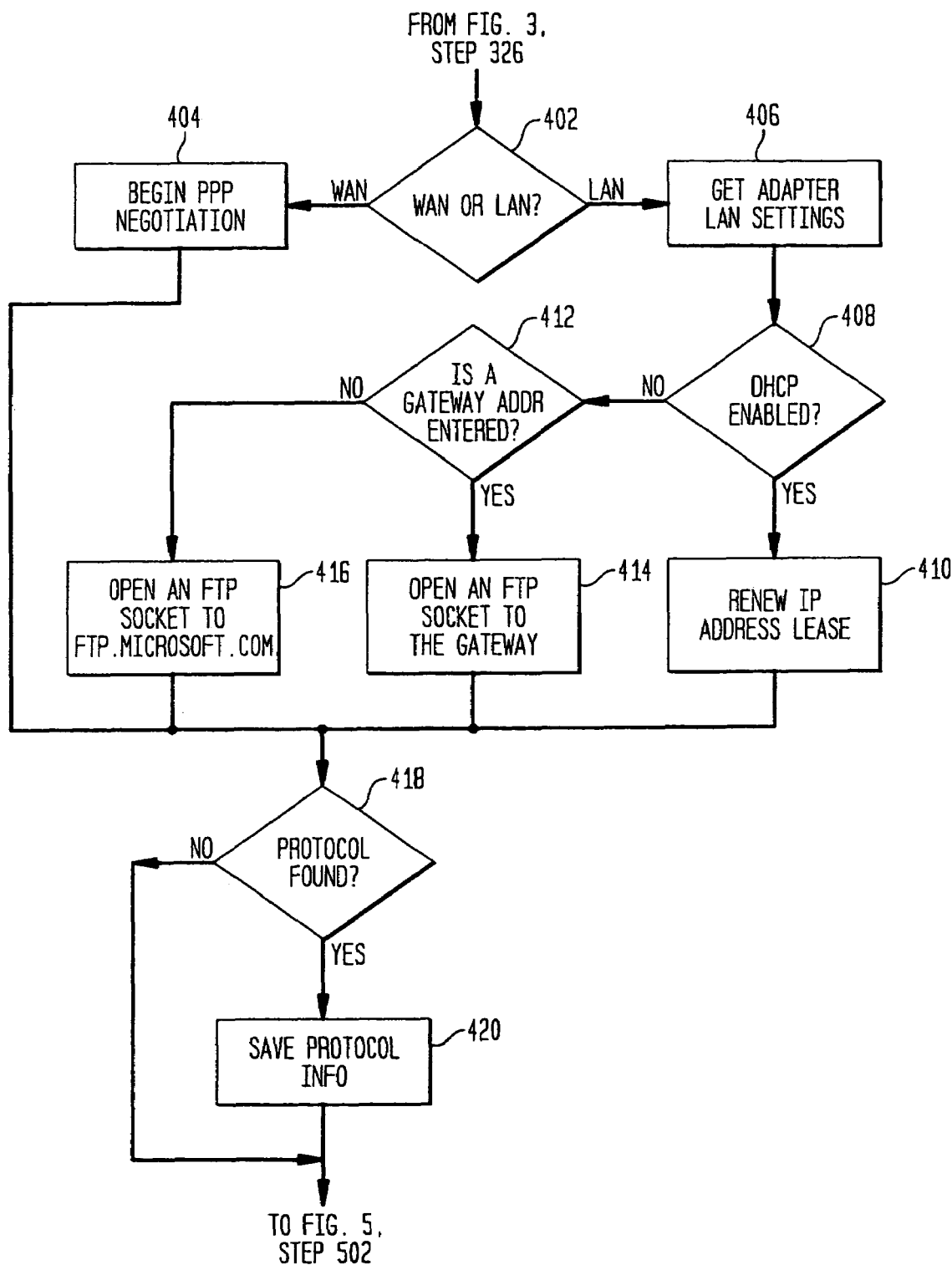

FIGS. 3-6 show one implementation of the invention, in which an application comprising four procedures is used to determine the head-end protocol for a DSL connection, set the driver to that protocol, and optimize the physical-layer settings. FIG. 3 shows a start-up procedure of the application. The start-up procedure establishes a connection to the head end, determines whether the protocol layer is up, and, if so, saves the protocol information. FIG. 4 shows a protocol query procedure of the application. The protocol query procedure comprises one or more steps directed at eliciting a response from the network so that the application can check the headers to determine the head-end protocol. FIG. 5 shows the disconnect procedure of the application. The disconnect procedure terminates the connection to the head end after each particular protocol is tested and can save physical layer data and loop data. FIG. 6 shows an optimal setting procedure that can further optimize the physical-layer settings for improved performance of the DSL connection following determination of the head-end protocol.

The processing of FIGS. 3-6 determines the network-layer protocol at the head end for a particular mode: either LAN or WAN. A higher-level installation application may be implemented to switch between LAN and WAN modes, in which case the system is re-booted before repeating the processing of FIGS. 3-6 for the new mode.

Referring now to FIG. 3, when the application is started (with an initial DSL protocol selected), the driver is set to an initial DSLAM setting (step 302 of FIG. 3). Different DSLAM types are tested by the application. While the modem may be able to communicate with a DSLAM other than the type configured for in the DSL modem driver, the correct DSLAM configuration may help to achieve optimum driver settings. In step 304, the transmit gain level is set to a minimum value, which, with repetition of the start-up procedure, will be incremented to a maximum value at specified increments to compensate for variations in the connection. For example, the gain level can be incremented from a minimum value of 0 dB to a maximum value of 2 dB at 2-dB increments. Steps 302 and 304 are optional steps that may improve performance of the application.

In step 306, the application determines whether the connection is a WAN-type connection or a LAN-type connection. This can be done by checking which DSL modem driver is loaded in the computing unit. If the connection is a WAN-type connection, then the application starts a dial-up networking procedure (step 308). If the connection is a LAN-type connection, then the application starts a LAN connection process (step 310). In either case, the application then determines if the physical layer is up (i.e., activated) (step 312). One method for determining whether the physical layer is up is to verify that a connect indication is received from the digital signal processor (DSP) at the client. If the physical layer is up, then the application records physical-layer information into a physical-layer data table (step 314). The physical-layer information to be recorded may include the transmit rate, the receive rate, and the receive average margin.

Next, the application determines whether the ATM layer is up (step 316). This can be done, for example, by checking the ATM-layer status in the driver that reads ATM headers. If the ATM layer is up, then the application determines whether the head-end protocol was already found during a previous pass (e.g., at a lower transmit gain level setting using the same protocol).(step 318). The application searches a protocol data table within the application to determine whether the head-end protocol was previously found. If the head-end protocol has not already been found (e.g., no data is saved in the protocol data table), then the application determines whether the protocol layer is up (step 320) by checking the driver protocol-layer status which compares protocol-layer headers on any messages that have been received from the head end. If the protocol headers are consistent with the protocol set by the application, then the protocol information is saved to the DSL modem driver (step 322), and the application routes to the disconnect procedure shown in FIG. 5.

If the physical layer is determined not to be up in step 312, then errors are recorded into the physical-layer data table (step 324). The application then routes to the disconnect procedure shown in FIG. 5. If the physical layer is up, but the ATM layer is determined not to be up in step 316, then the application routes to the disconnect procedure shown in FIG. 5. If the physical layer and the ATM layer are up, but the protocol layer is determine to have already been found in step 318, then the application routes to the disconnect procedure shown in FIG. 5. If the protocol layer is not up, as determined in step 320, then the application determines whether the protocol is known (step 326). If the protocol is known, then the application routes to the disconnect procedure shown in FIG. 5. If the protocol is not known, then the application routes to the protocol query procedure shown in FIG. 4.

Referring now to FIG. 4, the application determines whether the connection is a WAN connection or a LAN connection (step 402) by checking the driver. If the connection is a WAN connection, then the application begins point-to-point protocol (PPP) negotiation (step 404).

If the connection is a LAN connection, then the application retrieves the Adapter LAN settings from the CPE computing unit's operating system (step 406). These LAN settings can be in either of two modes. One mode is dynamic host configuration protocol (DHCP), in which the CPE does not need to know IP addresses that are temporarily assigned by the server or host. The other mode is static IP, in which addresses are fixed and are necessary to make a connection. The application determines whether DHCP is enabled (e.g., whether the system is in DHCP mode) (step 408). If DHCP is enabled, then the application attempts to renew the CPE computing unit's IP address lease (step 410).

If DHCP is determined not to be enabled for a LAN connection in step 408, then the application determines whether a gateway address is entered in the CPE computing unit's LAN settings (step 412). A gateway address is the address of a system through which the CPE computing unit can connect to the Internet. If a gateway address is entered, then the application attempts to open an FTP socket to the gateway (step 414). If no gateway address is entered in the LAN settings, then the application attempts to open a FTP socket to a known gateway, such as ftp.microsoft.com (step 416).

The application's effectiveness does not depend upon whether the Internet connection or lease renewal requests are successful. The purpose for attempting them is to elicit a response from the head end, so that the application can check the protocol-layer headers to determine whether the head-end protocol is consistent with the protocol that the CPE computing unit driver is set to. The next step 418 in the application is to determine whether the head-end protocol has been found. If the head-end protocol has been found, then the application saves the protocol information to the DSL modem driver (step 420), and routes to the disconnect procedure shown in FIG. 5. If the head-end protocol has not been found, then the application routes directly to the disconnect procedure shown in FIG. 5.

Referring now to FIG. 5, the disconnect procedure is accessed after each particular protocol is tested to terminate the connection, to determine whether the particular protocol at the head end has been found, and, if the particular head-end protocol has not be found, to select another protocol. The application records loop information (useful for determining loop length), bridge taps, and AM radio interference (step 502). The application then disconnects the line (e.g., the connection) that was previously established to test the current protocol (step 504).

In step 506, the application determines whether the physical layer was connected during the previous start-up procedure by checking the physical-layer data table, which would indicate errors if the physical layer was not up. If the physical layer was connected, then the application determines whether the protocol layer was found (step 508) by checking the protocol data table in the application.

If the protocol layer was not found, as determined in step 508, then the application checks the protocol data table to determine whether all protocols that are programmed into the application and driver have been tested (step 510). Since the application is preferably programmed for all known protocols, if the protocol layer was not yet found, the next untested protocol is then tested. However, if the protocol was not found and all protocols have been tested, the application will terminate and report an error to user (step 512).

If all protocols have not yet been tested (step 510), then the application changes the protocol of the driver. To change the protocol of the driver, the application first disables the driver (step 514), changes the protocol in the driver (step 516), and re-enables the driver (step 518). By disabling the driver without terminating the application, the application is able to attempt connections using different protocols without having to re-boot the CPE computing unit's operating system before each new protocol is tested, providing a performance advantage. For a WAN connection, the application preferably selects the next protocol in order, from the following protocols that are written and controlled by the Internet Engineering Task Force (IETF) (www.ietf.org):

WAN RFC2364 VCMUX;
WAN RFC2364 LLC ENCAPSULATION; and
WAN RFC2516 PPPOE.

For a LAN connection, the application preferably selects the next protocol in order, from the following protocols that are also written and controlled by the IETF:

LAN RFC1483 VC MUX ROUTED;
LAN RFC1483 VC MUX BRIDGED;
LAN RFC1483 LLC SNAP ROUTED; and
LAN RFC1483 LLC SNAP BRIDGED.

After enabling driver with the newly selected protocol in step 518, processing proceeds to step 520.

If the physical layer was determined not to be connected in step 506, or if the protocol layer was determined to have been found in step 508, then the application routes directly to step 520.

In step 520, the application checks the loop data table to determine whether all transmit gains have been tested. If all transmit gains have not been tested, then the application returns to the start-up procedure just prior to step 304 in FIG. 3 to repeat the processing of FIG. 3 with a different transmit gain level. Note that all gains are preferably tested for each DSLAM protocol in order to test physical-layer settings.

If all transmit gains have been tested as determined in step 520, then the application checks the loop data table to determine whether all DSLAM types have been tested (step 522). If all DSLAM types have not yet been tested, then the application returns to step 302 of FIG. 3 to repeat the processing of FIG. 3 with a different DSLAM type. If all DSLAM types have been tested, then the application searches the physical-layer data table for the best connect rate (step 524), records the settings that provide the best connect rate to the DSL modem driver (step 526), searches the loop data table for loop length, bridge taps, and AM radio interference data (step 528), and records that information to the DSL modem driver and saves the settings in the system to preserve across re-boots (step 530).

Referring now to FIG. 6, in step 602, the optimal line settings procedure sets the gain level to an initial, minimum gain level (e.g., −6 dB), which will be incremented (e.g., in 1-dB steps) to a maximum gain level (e.g., +1 dB) as the processing of FIG. 6 is repeated. The application checks an optimal setting physical-layer data table to determine whether all gain levels have been tested (step 604). If all gain levels have not yet been tested, then the application determines whether the connection is a WAN or LAN connection (step 606) and starts either a DUN WAN connection (step 608) or a LAN connection (step 610). After verifying that the physical layer is up (step 612) and that the ATM layer is up (step 614), the application records physical-layer data (e.g., transmit rate, receive rate, and receive average margin) (step 616) and, if appropriate, loop data (e.g., transmit gain, programmable gain amplifier (PGA) cutback, show time PGA, transmit state, and receive state) (step 618) for the current setting. The line is then disconnected (i.e., the connection is terminated) (step 620).

If the physical layer is determined not to be up in step 612, then errors are recorded in both the physical-layer data table (step 622) and the loop data table (step 624), before the line is disconnected in step 620. If the physical layer is determined to be up in step 612 and if the ATM layer is determined not to be up in step 614, then errors are recorded in the loop data table (step 624), before the line is disconnected in step 620.

After the application disconnects the line in step 620, the application returns to step 602 to repeat the procedure of making a connection and recording optimal setting data with at an incremented gain level.

After all gains are determined to have been tested in step 604, the application searches the physical-layer data table for the best connection rate (step 626), and records the settings that provide the best connection rate (step 628). Next, the application searches the loop data table for the corresponding loop length, bridge taps and AM radio interference information (step 630), and records that data in permanent memory (e.g., in the operating system registry file) for display by other applications and the driver when it boots (step 632).

The present invention provides an application that, when implemented on a computing unit, such as CPE 102 of FIG. 1, can determine the network-layer protocol at the head end of a DSL connection and set the DSL modem driver in the computing unit for that protocol. The present invention can also optimize physical-layer settings and provide information to determine loop length, bridge taps, and AM radio interference.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the scope of the invention as expressed in the following claims. For example, the DSLAMS and protocols could be attempted in different orders. Gain levels could be set over different ranges and incremented at different increments. Additional protocols and DSLAMS could be added to the options to be attempted. Also, the invention could be applied to networks other than the Internet, such as internets or other internets.

What is claimed is:

1. A method, implemented by customer premises equipment (CPE), for automatically and remotely determining a digital subscriber line (DSL) intermediate layer protocol of a head end of a DSL link between the CPE and the head end, wherein the CPE and the head end each have a protocol stack comprising an intermediate layer located below a transport layer and above a DSL layer, the method comprising the steps of:

(a) attempting to initiate a DSL connection over the DSL link to the head end using a selected intermediate layer protocol;

(b) determining whether the selected intermediate layer protocol is the intermediate layer protocol of the head end based on results of step (a);

(c) when the selected intermediate layer protocol is not the intermediate layer protocol of the head end, then selecting an other intermediate layer protocol and repeating steps (a) and (b); and (d) when the selected intermediate layer protocol is the intermediate layer protocol of the head end, then (i) saving the selected intermediate layer protocol for use in configuring the CPE and (ii) optimizing physical layer settings for the CPE configured with the selected intermediate layer protocol, wherein optimizing the physical layer settings comprises the steps of:

(1) attempting to initiate a DSL connection over the DSL link to the head end using the selected intermediate layer protocol at each transmit gain level in a sequence of different transmit gain levels;

(2) determining whether physical and asynchronous transfer mode (ATM) layers are up for each different transmit gain level;

(3) when the physical and ATM layers are up for a particular transmit gain level, then recording the physical layer settings for the particular transmit gain level; and (4) optimizing the physical layer settings by selecting a best connect rate for the different transmit gain levels.

2. The method of claim 1, wherein:
the transport layer is a TCP/IP layer; and
each protocol stack further comprises an application layer over the TCP/IP layer and an ATM layer between the network layer and the DSL layer.

3. The method of claim 1, wherein:
step (a) comprises configuring a DSL CPE for the selected intermediate layer protocol; and
step (b) comprises reading intermediate layer protocol headers of communications received from the head end to determine whether the selected intermediate layer protocol is the intermediate layer protocol of the head end.

4. The method of claim 1, wherein step (b) comprises the step of attempting to transmit one or more messages to a remote server via the head end to elicit a response from the remote server transmitted via the head end so that an intermediate layer protocol header in the response can be read to determine the intermediate layer protocol of the head end.

5. The method of claim 1, wherein step (b) comprises the steps of:

(b1) determining whether physical and ATM layers at the CPE are up;

(b2) when the physical and ATM layers are up, then determining whether an intermediate layer protocol at the CPE is up;

(b3) when the intermediate layer protocol at the CPE is up, then saving information about the intermediate layer protocol; and (b4) when the intermediate layer protocol at the CPE is not up, then implementing a query procedure to attempt to elicit a response from a remote server via the head end and, when the response is received, determining whether the selected intermediate layer protocol is the intermediate layer protocol of the head end.

6. The method of claim 1, wherein step (c) is implemented and then steps (a) and (b) are repeated without having to restart an operating system at the CPE when not switching between LAN and WAN modes.

7. The method of claim 6, wherein step (c) comprises the steps of:

(c1) disabling a DSL modem driver at the CPE;

(c2) changing an intermediate layer protocol in the DSL modem driver to the other intermediate layer protocol; and (c3) re enabling the DSL modem driver with the other intermediate layer protocol.

8. The method of claim 1, wherein steps (a) and (b) are repeated for each selected intermediate layer protocol at two or more different transmit gain levels.

9. The method of claim 1, wherein:
step (a) comprises the step of configuring the DSL modem driver at the CPE for the selected network layer protocol;
step (b) comprises the step of reading network layer protocol headers of communications received from the head end to determine whether the selected network layer protocol is the network layer protocol of the head end;

step (b) comprises the step of attempting to transmit one or more messages to a remote server via the head end to elicit a response from the remote server transmitted via the head end so that a network layer protocol header in the response can be read to determine the network layer protocol of the head end;

step (b) comprises the steps of:
- (b1) determining whether physical and ATM layers at the CPE are up;
- (b2) when the physical and ATM layers are up, then determining whether a network layer protocol at the CPE is up;
- (b3) when the network layer protocol layer at the CPE is up, then saving information about the protocol; and
- (b4) when the network layer protocol layer at the CPE is not up, then implementing a query procedure to attempt to elicit a response from a remote server via the head end and, when the response is received, then determining whether the selected protocol is the network layer protocol of the head end;

step (c) is implemented and then steps (a) and (b) are repeated without having to restart an operating system at the CPE when not switching between LAN and WAN modes;

step (c) comprises the steps of:
- (c1) disabling the DSL modem driver at the CPE;
- (c2) changing a network layer protocol in the DSL modem driver to the other network layer protocol; and
- (c3) re enabling the DSL modem driver with the other network layer protocol; and step (a) and (b) are repeated for each selected network layer protocol at two or more different transmit gain levels.

10. Customer premises equipment (CPE) adapted to automatically and remotely determine a digital subscriber line (DSL) intermediate layer protocol of a head end of a DSL link between the CPE and the head end, wherein the CPE and the head end each have a protocol stack comprising an intermediate layer located below a transport layer and above a DSL layer, the CPE comprising:
- (a) means for attempting to initiate a DSL connection over the DSL link to the head end using a selected intermediate layer protocol;
- (b) means for determining whether the selected intermediate layer protocol is the intermediate layer protocol of the head end based on results of means (a);
- (c) means for selecting an other intermediate layer protocol and returning to means (a) and (b), when the selected intermediate layer protocol is not the intermediate layer protocol of the head end; and
- (d) means for optimizing physical layer settings for the CPE configured with the selected intermediate layer protocol, when the selected intermediate layer protocol is the intermediate layer protocol of the head end, by:
  - (1) attempting to initiate a DSL connection over the DSL link to the head end using the selected intermediate layer protocol at each transmit gain level in a sequence of different transmit gain levels;
  - (2) determining whether physical and asynchronous transfer mode (ATM) layers are up for each different transmit gain level;
  - (3) when the physical and ATM layers are up for a particular transmit gain level, then recording the physical layer settings for the particular transmit gain level; and
  - (4) optimizing the physical layer settings by selecting a best connect rate for the different transmit gain levels.

11. The invention CPE of claim 10, wherein means (c) is implemented and then means (a) and (b) are repeated without having to restart an operating system at the CPE when not switching between LAN and WAN modes.

* * * * *

UNITED STATES PATENT AND TRADEMARK OFFICE
CERTIFICATE OF CORRECTION

PATENT NO. : 7,483,419 B2
APPLICATION NO. : 10/877851
DATED : January 27, 2009
INVENTOR(S) : William R. Bullman and Scott L. McCurdy It is certified that error appears in the above-identified patent and that said Letters Patent is hereby corrected as shown below:

In Column 10, on line 31, delete the word "invention".

Signed and Sealed this

Fifth Day of May, 2009

JOHN DOLL
*Acting Director of the United States Patent and Trademark Office*